Aug. 21, 1956 W. B. HAASE ET AL 2,759,269
INDICATOR GAUGE
Filed Nov. 4, 1954

INVENTORS
WALTER B. HAASE
and WILMAR F. SCHELD
BY
Roger B. McCormick
ATTORNEY

United States Patent Office 2,759,269
Patented Aug. 21, 1956

2,759,269

INDICATOR GAUGE

Walter B. Haase and Wilmar F. Scheld,
Wethersfield, Conn.

Application November 4, 1954, Serial No. 466,780

3 Claims. (Cl. 33—169)

This invention relates to a gauge and, more specifically, to an indicator gauge which may be used to particular advantage as an instrument for setting and adjusting power tools and which is also adaptable as an instrument for measuring the height, thickness, depth, diameter or other dimensions of a variety of objects.

It is the general object of the invention to provide a gauge of simple and economical construction and which, by reason of its simplicity and economical construction, is particularly attractive and useful to home workshop and hobby shop users, but which at the same time is so precise in operation as to also be a valuable instrument for the professional craftsman.

A more specific object of the invention is to provide an indicator gauge which includes a movable member calibrated for precise measuring purposes, which includes means for fixing the movable member in adjusted positions located by visual reference to the calibrations, and which also includes means readily accessible to the user so that the user can tell by his sense of touch when the movable member is properly engaged by an object to be measured in any preselected and fixed position of the movable member.

Other objects and advantages of the invention will become apparent to those skilled in the art from the following description of the invention taken in connection with the attached drawing wherein one specific embodiment of the invention is shown and in which drawing.

Figure 1:
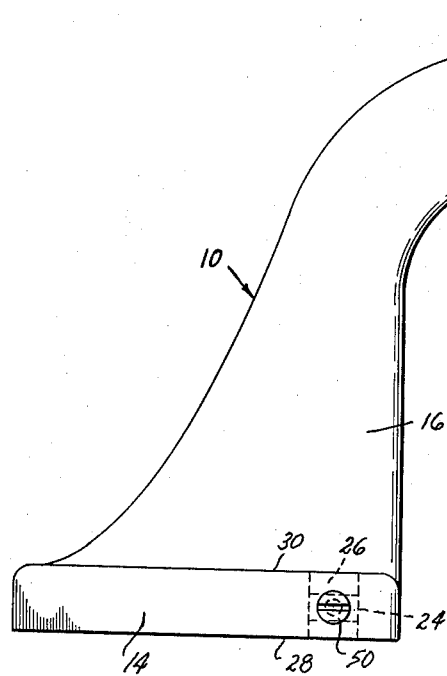
Fig. 1 is a side elevational view of the indicator gauge.
Figure 2:
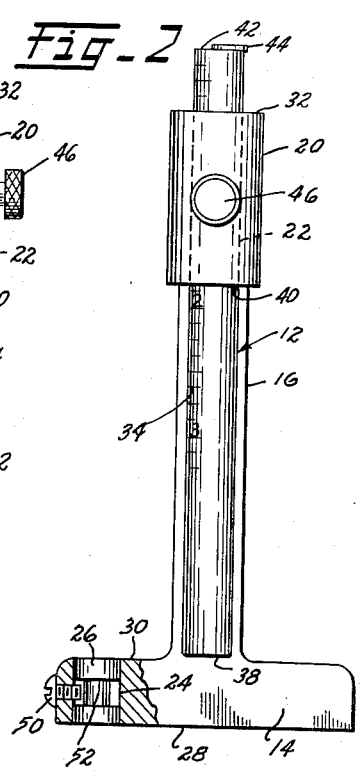
Fig. 2 is a front elevational view of the indicator gauge with a portion of its base shown in cross section to illustrate a detail of construction.

The embodiment of the invention shown in the drawing may be described in general terms as comprising a frame 10 which movably and adjustably supports gauging means in the form of a calibrated measuring bar 12 in such a manner that when the base of the frame is placed against a flat reference surface with the measuring bar normal to the surface, the calibrations on the measuring bar can be read with reference to the frame to indicate the distance separating the said surface and the measuring bar. The gauge is, of course, used to measure an object placed upon or extending from the surface in the direction of the measuring bar, the measurement taken being that dimension of the object normal to the surface. A specific application or use of the device is in setting a circular power-driven saw blade to project a selected distance above a saw table so as to cut a groove of selected depth in a work piece. For purposes of convenience, the gauge will be specifically described as particularly adapted for the aforesaid use, but it should be understood that the gauge has a wide variety of other uses, some of which will be briefly described hereinafter.

As shown on the drawing, the frame 10 includes a base 14, a vertically extending post 16, and a laterally projecting arm 18 having a bushing or sleeve 20 formed on its extending end which bushing has a bore 22 slidably receiving the measuring bar 12. The foresaid elements of the frame 10 are preferably integrally formed of metal and the said frame can be simply and economically cast in the form shown and thereafter machined. As shown on the drawing, the base 14 is substantially flat and of substantially rectangular configuration and the said base is disposed in a horizontal plane so that the post 16 extends vertically upwardly therefrom. The bushing 20 is arranged on the laterally extending arm 18 so that its bore 22 extends vertically. As used herein, the terms "horizontal," "vertical," "top," and "bottom," etc. are for convenient reference to the drawing and are not meant as terms of limitation, it being understood that the gauge of this invention can be used in other than the position shown in the drawing.

An important feature of the present invention is the provision of a vertically extending circular opening or bore 24 in the base 14 which slidably receives a feeler plug 26. The construction and purpose of the feeler plug will be described in detail hereinafter, but it should be noted that the bore 24 and plug 26 extend from the bottom surface 28 to the top surface 30 of the base 14.

After the frame 10 has been cast, the only machining operations necessary are to provide a flat, ground, horizontal bottom surface 28 on the base 14; to machine the vertical bore 22 in the bushing 20; to machine the vertical bore 24 in the base 14; and to grind the top surface 32 of the bearing 20 in a horizontal plane which is spaced from the plane of the bottom surface 28 by a fixed distance.

The bushing bore 22 and the measuring bar 12 are preferably cylindrical and dimensioned for free sliding and rotational movement of said bar within the bushing. The measuring bar is calibrated in two vertically extending side-by-side scales 34 and 36 of equal and offset increments. That is, if the scale 34 is divided into $\frac{1}{32}''$ calibrations, the scale 36 should also be divided into $\frac{1}{32}''$ increments with each $\frac{1}{32}$ indicia on the scale 36 located precisely at the midpoint separating the two adjacent $\frac{1}{32}$ calibrations on the scale 34. Thus, by locating the scales 34 and 36 in side-by-side relationship for simultaneous observation, measurements can be read with great precision to $\frac{1}{64}''$ and measurements falling between calibrations can be readily calculated by interpolation. It has been found that the error in visual interpolation by a person of ordinary sight and skill should not exceed .005 inch.

The zero calibrations for the scales 34 and 36 should be placed on the measuring bar 12 at precisely the distance from the bottom end 38 thereof which equals the fixed distance between the horizontal plane of the bottom surface 28 on the frame 10 and the horizontal surface 32 on the bushing 20. Thus, the scale is read along or with reference to the surface 32, the plane of said surface providing the sighting plane for reading the measuring bar. It will be readily understood that the measuring bar as shown in the drawing can be used to measure the vertical dimension of any object placed below the bushing 20 on a surface which is co-planar with the surface 28 when the said measuring bar rests on the top of the said object. It will also be apparent that if the indicator gauge is placed on a horizontal saw table and a circular saw disposed in a vertical plane is elevated through a slot provided in the table so as to engage the bottom end 38 of the measuring bar, the amount of blade elevation can be read on the scale 34 and 36 along the horizontal surface 32. The only limitation in the measurement of vertical height is imposed by the distance that the bottom surface 40 of the bushing 20 is disposed above the plane of the bottom surface 28 on the base 14. This distance will, of course, vary with the height of the vertical post 16.

It should also be understood that the measuring bar 12 can be used to measure depth or vertical dimensions below the plane of the surface 28 by extending the length of the measuring bar 12 beyond that shown. That is, if the measuring bar is extended in length and provided with a scale which extends upwardly as well as downwardly from the zero point, the bottom end 38 of the measuring bar can be dropped below the plane of the surface 28, the amount of drop being measured by reading that portion of the scale above the zero point in the plane of the surface 32.

Figure 3:
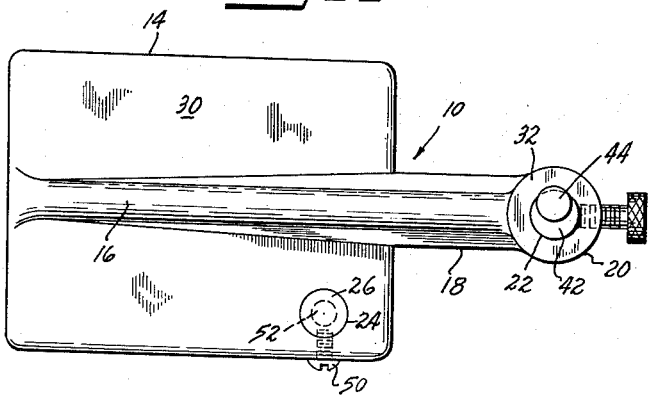
Fig. 3 is a top view of the gauge.
Figure 4:
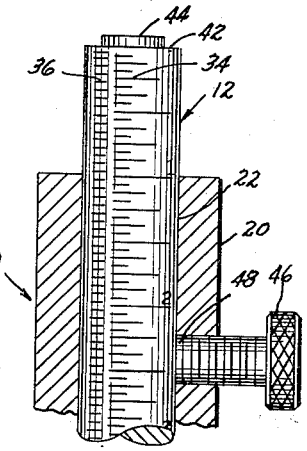
Fig. 4 is a fragmentary cross-sectional view with parts being shown in elevation to illustrate details.

In the particular embodiment shown, the measuring bar 12 is not extended above the zero point on the scales 34 and 36. That is, the top end 42 of the measuring bar corresponds with the zero point on the scales 34 and 36. Thus, the measuring bar 12 is precisely equal in length to the fixed vertical distance separating the bottom horizontal surface 28 on the frame 10 and the top horizontal surface 32. Also in the embodiment shown, the bottom end 38 of the measuring bar 12 is not permitted to drop below the horizontal plane of the bottom surface 28. The means preventing drop of the measuring bar comprises a stop fixed to the top end 42 of the said measuring bar to engage the bushing surface 32 and limit downward movement of the said measuring bar. The said stop preferably comprises a pin which is press fitted into the top end 42 of the measuring bar and which has a flanged head 44 extending beyond the peripheral edge of the top end of the measuring bar so as to be engageable with the surface 32. As best shown in Fig. 3, the stop pin is located off center with respect to the center line of the measuring bar so that the flanged head 44 of the said pin will project from the side of the measuring bar opposite to the scales 34 and 36. Thus, the calibrations on the scales 34 and 36 adjacent the top end 42 of the measuring bar 12 are unobstructed and can readily be observed.

While the indicator gauge has many uses with the measuring bar 12 freely movable with respect to the frame 10, as for example in measuring the vertical dimension of an object, the said gauge also has a variety of uses with the measuring bar 12 located in a preselected adjusted position with respect to the frame 10. That is, in many uses it is desirable to set the bottom end 38 of the measuring bar a selected distance above the plane of the surface 28. This distance can, of course, be selected by vertical adjustment of the measuring bar to the position where the scale reading indicates the selected distance. The measuring bar is fixed in the aforesaid adjusted position by tightening a hand operated set screw 46 which is threaded in the bushing 20 to engage the measuring bar within the bore 22. It is preferred that a leather disk 48 be fixed to the inwardly projecting end of the set screw 46 for engagement with the measuring bar 12 so that the said measuring bar will not be scratched or otherwise marked by reason of set screw engagement.

A particular use of the indicator gauge with the measuring bar fixed in a preselected adjusted position occurs when the gauge is used to set the height of a vertically disposed circular saw blade. More specifically, it may be desired, for example, to elevate the saw blade to $31/64''$ so as to cut a groove $31/64''$ deep in a work piece. The measuring bar is adjusted so that the $31/64''$ calibration resides in the plane of the surface 32 (as shown in Fig. 1) and then the set screw 46 is tightened. Then, the gauge is positioned on the saw table with the bottom surface 28 of the base 14 resting on the table and with the bottom end 38 of the measuring bar 12 located over the saw slot in the table. Then, the saw blade is elevated to engage the said bottom end 38 of the measuring bar.

It will be readily understood that when the saw blade engages the measuring bar it tends to lift the said bar and the frame 10 from the table. The tendency to lift the indicator gauge is manifested in pivotal movement of the gauge on its base 14 about the edge thereof farthest removed from the measuring bar. This lifting or pivoting can be detected within .001" of movement by the sense of touch. That is, if the user will place his finger on the feeler plug 26 so that his finger simultaneously engages the top surface 30 of the base 14, he can detect movement of the feeler plug with respect to the base 14 even though such movement may be less than .001". It will be quite apparent that movement of the feeler plug 26 relative to the base 14 will take place within the bore 24. The bore 24 and feeler plug 26 are dimensioned for free sliding movement of said plug within the bore and, therefore, the said plug will be gravity biased. However, the feeler plug 26 is prevented from inadvertent removal from the bore by means of a stop screw 50 threaded into the base 14 to project into the bore 24. The plug 26 has a reduced diameter portion 52 intermediate its ends and in operating clearance from the projecting end of the screw 50 whereby the said plug may move vertically a limited amount.

When the plug 26 is initially placed within the bore 24 and the stop screw 50 threaded thereinto to retain the plug, it is preferred that the top of the said plug and the adjacent area of the top surface 30 of the base be ground in the same plane with the bottom end of the plug and the bottom surface of the base residing in the same plane. With the top of the plug and the top surface of the base residing in the same plane, it is easier to detect movement of the plug within the bore.

In operation of the indicator gauge in setting a vertically adjustable saw blade, the blade is elevated to engage the bottom of the measuring bar 12 and is further elevated to effect a very slight, but detectable, movement of the plug 26 within the bore 24. Then, the vertical height of the saw blade is reduced while still in engagement with the measuring bar until the top of the plug 26 and the top surface of the base again coincide. The user is then assured that the blade projects the preselected distance.

While the invention has been described in connection with one specific embodiment, it should be understood that we do not intend to limit the scope of the invention to the details of the described embodiment otherwise than indicated by the claims which follow.

We claim as our invention:

1. In an indicator gauge for measuring the vertical dimension of an object extending above a flat horizontal surface, the combination comprising a frame including a base having a horizontal bottom and a horizontal top surface, a post extending upwardly from the base, an arm extending laterally from the post, and a bushing on the projecting end of the arm having a vertical bore, a measuring bar slidably disposed in said bore and having a vertical scale which can be read with reference to the frame, means for securing the bar in adjusted vertical positions in said bore, and means for detecting engagement between the bottom end of the measuring bar and an object extending above said flat horizontal surface, said detecting means comprising a feeler plug freely movable in said base in a vertical plane which feeler plug extends between the bottom of the base and the horizontal top surface thereof with its top end residing in the plane of said top surface.

2. In an indicator gauge for measuring the vertical dimension of an object extending above a flat horizontal surface, the combination comprising a frame including a base having a horizontal bottom and a horizontal top, a post extending upwardly from the base, an arm extending laterally from the post, and a bushing on the projecting end of the arm having a vertical bore and a horizontal top surface, a measuring bar slidably disposed in said bore and being of sufficient length to extend between said flat surface and the horizontal surface on the bushing, said bar having a vertical scale which can be read in the plane of the top surface of the bushing and with reference thereto, means for securing the bar in adjusted vertical positions in said bore, a stop for limiting vertical movement of the measuring bar which stop includes means projecting horizontally from the top surface of the measuring bar for engagement with the horizontal top surface of the bushing, and means for detecting engagement of the bottom end of the measuring bar with an object extending above said flat surface, said detecting means comprising a feeler plug which is gravity biased for free sliding movement in a vertical plane within said base, the said feeler plug extending from the horizontal bottom of the base to the horizontal top of the base with the top of the plug normally residing in the plane of the top of the base.

3. In a device for gauging the elevation of an object above a horizontal reference surface, the combination comprising a frame which includes a base adapted to rest on the reference surface and having a top surface, gauging means supported by said frame for engagement with the top of the object with the base resting on the reference surface, and means for detecting engagement between the gauging means and the object, the said detecting means comprising a feeler plug which is movable vertically in said base and which has a top surface and a bottom surface respectively coinciding with the top surface of the base and the reference surface when the base rests properly on the reference surface.

References Cited in the file of this patent

UNITED STATES PATENTS

| | | |
|---|---|---|
| 60,186 | Hathaway | Dec. 4, 1866 |
| 381,937 | Linsley | May 1, 1888 |
| 784,903 | Stemmrich | Mar. 14, 1905 |
| 1,225,835 | Luck | May 15, 1917 |

FOREIGN PATENTS

| | | |
|---|---|---|
| 2,885 | Great Britain | Feb. 24, 1887 |